United States Patent [19]
Podrazhansky et al.

[11] Patent Number: 5,504,415
[45] Date of Patent: Apr. 2, 1996

[54] METHOD AND APPARATUS FOR AUTOMATIC EQUALIZATION OF SERIES-CONNECTED BATTERIES

[75] Inventors: Yury M. Podrazhansky; Mikhail Y. Podrazhansky, both of Norcross; Mikhail B. Golod, Dunwoody, all of Ga.

[73] Assignee: Electronic Power Technology, Inc., Norcross, Ga.

[21] Appl. No.: 162,581

[22] Filed: Dec. 3, 1993

[51] Int. Cl.⁶ .................................................. H02J 7/00
[52] U.S. Cl. .................................... 320/18; 320/17
[58] Field of Search ......................................... 320/17, 18

[56] References Cited

U.S. PATENT DOCUMENTS

| | | | |
|---|---|---|---|
| 4,849,682 | 7/1989 | Bauer et al. | 320/15 |
| 5,153,496 | 10/1992 | LaForge | 320/17 |
| 5,387,857 | 2/1995 | Honda et al. | 320/18 |

Primary Examiner—Steven L. Stephan
Assistant Examiner—Nicholas Ponomarenko
Attorney, Agent, or Firm—Jones & Askew

[57] ABSTRACT

A method and an apparatus (10) for equalizing the state of charge among a plurality of series-connected batteries (B1–BN). A module (12A–12N) is connected in parallel with each of the batteries (B1–BN), respectively. Each module (12A–12N) contains a voltage divider circuit (40) so that the voltage across a battery may be measured to determine the state of charge, and a circuit (43) which selectively shunts charging current around a battery or applies a discharging current to a battery. A charging transistor (30) applies a charging current to the series of batteries (B1–BN) and, depending upon the state of charge of each battery, a portion of the charging current may be shunted around the battery by its associated module (12) so as to prevent overcharging of the battery. A controller (14) monitors the state of charge of each of the batteries and the temperature of each of the batteries and adjusts the portion of the charging shunted around an individual battery so as to rapidly equalize the state of charge among the different batteries (B1–BN). This process is automatically conducted whenever a charging current is applied to the batteries so that the batteries are maintained in an equalized condition.

6 Claims, 3 Drawing Sheets

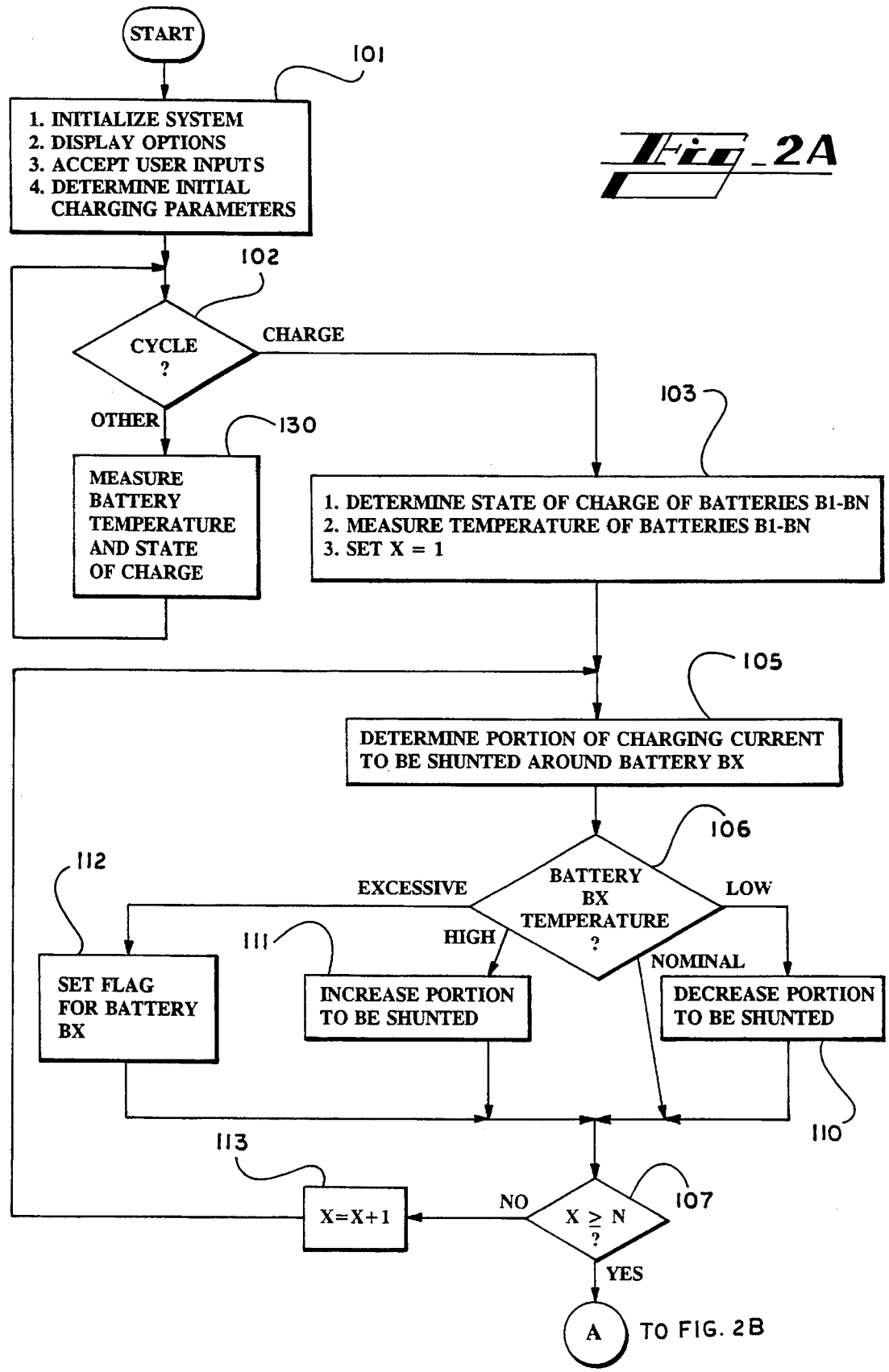
Fig_2A

METHOD AND APPARATUS FOR AUTOMATIC EQUALIZATION OF SERIES-CONNECTED BATTERIES

TECHNICAL FIELD

This present invention relates to battery chargers and, more particularly, discloses a device which automatically equalizes the charges in the different batteries in a plurality of series-connected batteries during a charging process.

BACKGROUND OF THE INVENTION

An individual battery cell has a rather low voltage, typically in the range of 1 to 2.2 volts. This low voltage is quite suitable for some purposes, such as small flashlights, watches, handheld calculators and personal radios. However, a single cell is inadequate for uses which have large power requirements, such as forklifts, golf carts, electric vehicles, electrically started vehicles, and back-up power supplies. Therefore, many battery-powered devices require a higher voltage. For example, automobiles typically require 6 or 12 volts, some diesel powered vehicles require 24 volts, uninterruptable power supply (UPS) systems require 120 or 240 volts, and some other systems require even higher voltages. The battery cells are connected in series to achieve these higher voltages. For example, a nominal 12 volt automobile battery will have six cells connected in series, each cell having a charged voltage of approximately 2.2 volts. Likewise, twelve cells are connected in series to provide a nominal 24 volt supply. To achieve even higher voltages cells are typically connected in series to form batteries, as described above, and the batteries are connected in series to form battery packs. For example, ten 12 volt batteries are connected in series to provide a nominal 120 volt supply. The current handling capability of a single cell or battery is limited by practical considerations so cells, batteries, and battery packs are connected in parallel to achieve higher currents.

One example of a UPS battery configuration is made by Exide Corporation, and has a full charge rating of 132 volts, has 60 batteries rated at 1000 amp hours each, and can accept a charging current of 200 amperes. UPS systems are typically installed at hospitals, television and radio stations, telephone switching stations, and other places where the noninterruption of electrical power is critical.

If battery cells could be made absolutely identical to each other and subjected to identical conditions then series-connected cells would have the same states of charge throughout their lifetimes. However, battery cells cannot be made to be absolutely identical to each other so some cells discharge, charge and age faster than other cells. As a result, at some point the different cells may have such different states of charge that one or more cells may be fully charged but other cells may have minimal or no charge. When a cell finally reaches the point that it is discharged but the other cells are still at least partially charged, further use of the series-connected cells will cause the discharged cell to be subjected to a reverse polarity voltage, which can cause further deterioration of that cell, overheating, gassing, or even an explosion.

Likewise, batteries cannot be manufactured to be absolutely identical. Furthermore, whereas the cells in a battery may have been manufactured from the same materials, activated at approximately the same time, and subjected to approximately the same temperature conditions so that there is some degree of match between the individual cells, the same cannot be said for different batteries. That is, one 12 volt battery may be a year older than another 12 volt battery and may have been subjected to more or fewer charge/discharge cycles, more or fewer deep discharge cycles, higher or lower temperature extremes, etc. Also, batteries which are on the outside of a battery pack have better ventilation and may be cooler than batteries which are on the inside of the battery pack and have poor or no ventilation. However, batteries on the outside of the battery pack may also be subjected to greater and more rapid extremes in temperature than the batteries which are on the inside of the battery pack and are therefore somewhat insulated from the surrounding environment.

Therefore, it is more likely than not that the temperature, the internal impedance, and the state of charge will be different from battery to battery in a battery pack and will be exaggerated as the batteries undergo aging, temperature cycling, and charging/discharging cycles. Thus, at some point, one of the batteries will reach a state of zero charge when others of the batteries still have substantial charges and further discharging of the battery pack will cause the battery with zero charge to be subjected to a reverse polarity voltage, with the same consequences for that battery as described above for an individual cell which is reverse charged.

Equalization is the process whereby all of the batteries are brought to the same state of charge. Equalization is very important because it prevents the application of a reverse polarity voltage to a battery. Also, the internal impedance will be different from one battery to another. The internal impedance depends upon the state of charge of the battery, the temperature of the battery, the amount of electrolyte present, the amount of water in the electrolyte, and the state (deterioration) of the electrodes. A good battery will have a lower impedance when fully charged and a higher impedance when fully discharged. The more that the charging voltage exceeds the battery voltage, the more the current that will be forced into the battery. If the amount of current forced into the battery exceeds the current that the battery can use for charging then the excess current will cause electrolysis of the battery water, gassing, and heating of the battery. Therefore, when a charging current is applied to a battery pack greater heating will occur in a more fully charged battery than the heating in a lesser-charged battery. The states of charge between different batteries may be somewhat equalized by continuing to apply a charge to the battery pack even though some of the batteries have already been completely charged. However, gassing as well as overheating of these more fully charged batteries may occur. Furthermore, if high a current pulse charging technique is used then the application of a large charging current pulse to a fully charged battery may cause damage to or catastrophic failure of the battery.

At 90% of full charge, a battery will not readily accept a high charging rate. Therefore, if the charging current is set so as to rapidly charge the weakest battery, the charging current will be too high for a more fully charged battery and damage can be done to the more fully charged battery. However, if the charging current is reduced to prevent damage to the more fully charged battery then the equalization process will take a much longer time and will not be finished at the same time that the charging process is finished. For example, if each battery in a battery pack has a full-charge rating of 12 volts and 200 ampere-hours, all batteries but one are fully charged, and this one battery has a state of charge of only 90% of full charge, then 20 ampere-hours of charging current must be applied to that battery to bring it to a full charge. To accomplish this, a 20 amp charge could be applied for 1 hour, or a 40 amp charge could be applied for 30 minutes, or a 160 amp charge applied for 7.5 minutes, etc. However, the fully charged batteries may not accept the 160 amp charging current, or even the 40 amp charging current, without overheating, gassing, or damage. Therefore, to avoid damage to the fully charged batteries during the equalization process, the charging current must be limited to 20 amperes, or less, and the charging time must be extended to 1 hour, or more, to add enough charge to the lesser charged battery to bring it to the same full charge level as the other batteries.

Even though equalization is important, most persons regard batteries as "install and forget" items, so the equalization process is rarely performed on a regular basis in actual practice.

Therefore, there is a need for a method and an apparatus for automatically, continuously, and rapidly equalizing the state of charge among a plurality of series-connected cells or batteries during a charging process in a manner which will not cause damage to the cells or batteries.

SUMMARY OF THE INVENTION

During a charging process, the present invention provides for measuring the state of charge of each cell or battery in the series combination, and bypassing around each cell a portion of the charging current which is in excess of the current needed to properly charge that cell.

The present invention provides for equalizing a state during a charging process by measuring the state of charge for the first cell and the state of charge for the second cell, determining a portion of a charging current to be shunted around the first cell based upon the state of charge for the first cell and a portion of the charging current to be shunted around the second cell based upon the state of charge for the second cell, and shunting around the first cell the portion of the charging current determined for the first cell, and shunting around the second cell the portion of the charging current determined for the second cell. In the situation where a cell requires the full charging current then none of the charging current is shunted around that cell.

The present invention also provides for equalizing a state of charge for each cell in a plurality of series-connected cells during a charging process by measuring the state of charge for each of the cells, determining a portion of a charging current to be shunted around each of the cells based upon the state of charge for that respective cell, and shunting around each of the cells the portion of the charging current determined for that cell. In the situation where a cell needs the entire charging current then none of the charging current is shunted around that cell.

In a direct current charging system the state of charge of the cells may be measured at predetermined intervals or by intervals determined by some other factor, such as the battery voltage or the battery temperature. In pulse charging systems the state of charge may be measured prior to, during, or after each charging pulse or a predetermined number of charging pulses, or at a predetermined time interval, or based upon some other factor such as battery voltage or battery temperature.

The present invention provides for measuring the voltage across each battery during either the charging cycle or the discharging cycle. This voltage indicates battery condition as determined by the state of charge, internal impedance, temperature, and physical condition (electrolyte, water, electrode deterioration, etc.). In response to this voltage the charging current through a battery is adjusted to match the condition of that battery. These measurements and adjustments are made very rapidly, and without interrupting the charging or discharging processes, so that a good battery can be quickly equalized and charged and a bad battery can be quickly identified and the charging and discharging processes can be terminated before damage can occur.

The present invention provides an apparatus which has a device to measure the voltage across each cell so as to determine the state of charge for each cell, a controller to determine a portion of a charging current to be shunted around each cell based upon the state of charge for each cell and, for each cell, a device controlled by the controller for shunting around that cell the portion of the charging current determined by the controller for that cell.

The controller of the present invention also monitors the battery temperature to determine if a battery is being overheated and adjusts the amount of charge shunted around a cell in response to the temperature of the battery.

The present invention also provides a control keyboard and a display for allowing a user to indicate the characteristics of the series combination being equalized, such as the number of cells, the voltage per cell or the total voltage, the type of cell or battery, the maximum charging and/or discharging currents, etc.

Therefore, it is an object of the present invention to provide a method and an apparatus for equalizing a plurality of series-connected batteries or cells during the charging process in a manner which minimizes overheating of or damage to the cells or batteries by altering the charging current applied on a cell-by-cell or on a battery-by-battery basis.

BRIEF DESCRIPTION OF THE DRAWINGS

FIGS. 2A and 2B are a flow chart illustrating the operation of the preferred embodiment of the present invention.

DETAILED DESCRIPTION

Figure 1:
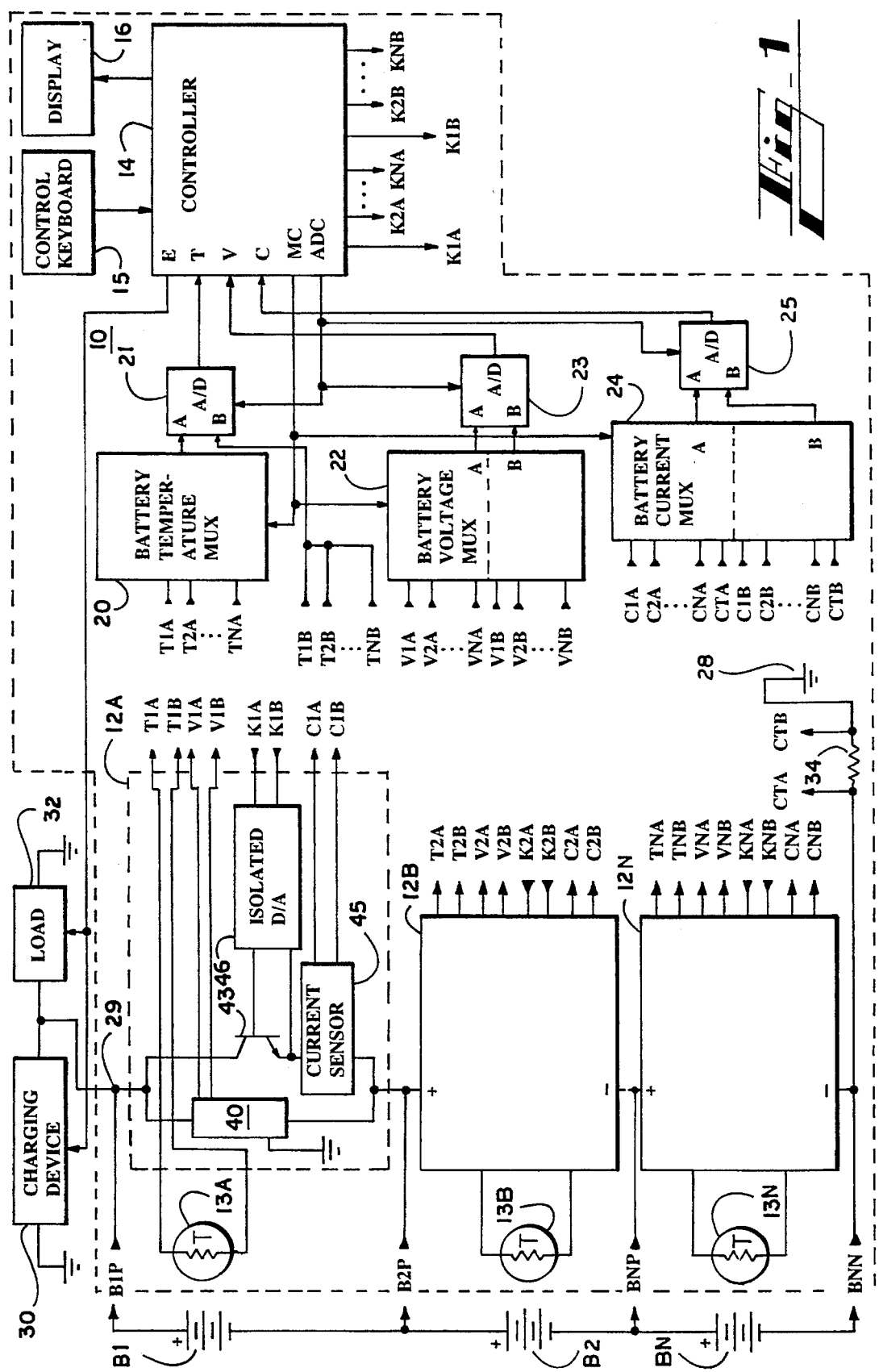
FIG. 1 is a block diagram of the preferred embodiment of the present invention.

Turn now to the drawing in which like numerals represent like components throughout the several figures. The preferred embodiment of the present invention 10 comprises a plurality of modules 12A–12N associated with respective batteries B1–BN, the modules 12 controlling the charging and discharging currents on a per battery basis and providing information regarding the state of charge of each battery, a plurality of temperature sensing devices 13A–13N associated with respective batteries B1–BN, the sensing devices 13 providing information regarding the temperature of each battery, a controller 14 which uses the information to determine the state of charge of each battery and determine the appropriate charging current for a particular battery, an optional control keyboard 15 to allow an operator to input information regarding the batteries, a display 16 to indicate the state of charge of the batteries B1–BN, and, optionally, the selections made by the operator.

Consider first the battery pack comprising the plurality of series-connected batteries B1–BN. Although batteries are shown, this is purely for convenience of illustration and discussion and it should be understood that where a battery, such as battery B1, is shown, an individual cell may be substituted therefor so as to form a battery from a combination of series-connected cells instead of to form a battery pack from a combination of series-connected batteries. Each battery B has an associated temperature measuring device 13 and an equalizing module 12. The equalizing modules 12 are, like the batteries B, connected in series. Each equalizing module 12 is connected in parallel with its associated battery B. The positive terminal of battery B1 is connected, via connection B1P and node 29, to the positive terminal of module 12A, the charging circuit 30, and the load 32. The charging circuit may be any charging circuit but is preferably a charging circuit as described in U.S. patent application No. 07/824,113, filed Jan. 22, 1992, by Podrazhansky and Popp, which is hereby fully incorporated herein by reference. The load is the electrically powered device, such as the motor in an electric vehicle, the converter in a UPS, etc. The negative terminal of module 12A is connected to the positive terminal of module 12B and also, via connection B2P, to the negative terminal of battery B1 and to the positive terminal of battery B2. Similarly, other batteries and modules may be added in series so that the next to last module is connected to the positive terminal of module 12N and, via connection BNP, to the negative terminal of the next to last battery and to the positive terminal of battery BN. Finally, the negative terminal of battery BN is connected via connection BNN to the negative terminal of module 12N and one input of a current sensing resistor 34. The other end of resistor 34 is connected to a circuit ground or return at node 28.

Controller 14 is microprocessor-based and contains a microprocessor, a read only memory, a random access memory, and input/output peripheral devices. The design and construction of a microprocessor-based controller, such as controller 14, is, in general, well known.

Modules 12A–12N have output lines T1A–TNA and T1B–TNB connecting temperature sensing devices 13 to controller 14 so that the temperature of each individual battery B may be measured. Modules 12A–12N also have battery voltage output lines V1A–VNA and V1B–VNB to allow controller 14 to determine the voltage across each battery B, current outputs C1A–CNA and C1B–CNB to allow controller 14 to determine the portion of the charging current being shunted around each battery B, and control lines K1A–KNA and K1B–KNB to allow controller 14 to control the portion of the charging current being shunted around each battery B.

Temperature sensing devices 13A–13N, which may be thermistors, are attached to or otherwise thermally connected to batteries B1–BN, respectively, so as to provide an indication of the temperature of the associated battery. Battery temperatures change slowly so it is permissible to sample the temperature of a battery at selected intervals, such as every few seconds. To reduce the cost and the number of components required, the outputs T1A-TNA are connected to the inputs of a battery temperature multiplexer 20. The output of multiplexer 20 is connected to one input (A) of an analog-to-digital (A/D) converter 21. The T1B–TNB outputs of thermistors 13A–13N are all connected together and are connected to the other input (B) of A/D converter 21. The output of A/D converter 21 is connected to the temperature T input of controller 14. Controller 14 controls which battery temperature is being monitored at any point in time via the multiplexer control (MC) output and controls the conversion process via its analog-to-digital converter (ADC) control output.

Likewise, the battery voltage outputs V1A-VNA and V1B–VNB are provided through a battery voltage multiplexer 22 to the A and B inputs of an A/D converter 23, the output of which is responsive to the voltage difference at its A and B inputs and is connected to the voltage V input of controller 14. In addition, current outputs C1A–CNA and C1B–CNB and the total current outputs CTA and CTB are provided through a battery current multiplexer 24 to the A and B inputs of A/D converter 25, the output of which is responsive to the voltage difference at its A and B inputs and is connected to the current C input of controller 14. It will be noted that resistor 34 is in series with the batteries B and therefore the voltage developed across resistor 34 indicates the total charging current being supplied to the batteries B and the total discharging current being drawn from the batteries B.

If a charging current is a steady state current or has a sufficiently long pulse width then it is possible to determine the charging current and the shunted charging current simultaneously or during a single pulse for each of the batteries B using current multiplexer 24. However, if the pulse width is not sufficiently long to permit this then the current through one battery may be sampled on one pulse, the current for another battery may be sampled for the next pulse, and so forth so that the shunting current for a given battery B is sampled every several pulses. This is acceptable because the battery characteristics have a slow response and will vary very little on a pulse-to-pulse basis. In another embodiment, sample and hold circuits (not shown) may be used between the modules 12 and the inputs to current multiplexer 24 so that values for all shunting currents at a single point in time may be obtained by controller 14. Controller 14 preferably monitors the voltage of each battery B when a charging current is being applied and dynamically adjusts the portion of the charging current shunted around each battery B. Alternatively, controller 14 may monitor the voltage of each battery B to determine the state of charge of each battery B when a load (discharging current) is being applied. Controller 14 adjusts the portion of the current shunted around each battery B, and therefore adjusts the equalization process at the same time as the charging process is being performed. Although controller 14 is shown as being dedicated to the equalization process, it will be appreciated that controller 14 may, if desired, also control the charging and discharging processes.

Consider now the construction of a module, such as module 12A. Module 12A contains a voltage divider circuit 40 which is connected to circuit ground and, via terminals B1P and B2P, across battery B1 so as to provide a divided battery voltage on output lines V1A and V1B. Module 12A also contains an NPN transistor 43 connected in series with a current sensor 45, such as a resistor, a pulse transformer, or a direct-current current transformer. This combination of transistor 43 and current sensor 45 is connected via terminals B1P and B2P across battery B1. When a charging current is being applied it will flow into battery B1 and transistor 43. In the preferred embodiment, transistor 43 need not be completely on but may be turned on to the desired degree. By shunting some of the charging current through transistor 43 the amount of charging current passing through battery B1 can be controlled so as to avoid overcharging of and damage to battery B1.

The current outputs C1A and C1B of current sensor 45 provide an indication of the current drawn by transistor 43 and thereby shunted around battery B1. This allows controller 14 to adjust the amount of base drive provided to transistor 43 so as to precisely control the amount of current drawn by transistor 43. The K1A and K1B outputs of controller 14 are provided to the inputs of an isolated digital-to-analog (D/A) converter 46. In some cases, the positive voltage at node 29 may be several hundreds of volts but controller 14 preferably has an operating voltage of only 5 volts. Therefore, D/A converter 46, which may incorporate an optical isolator, magnetically coupled device, or voltage level shifting circuit, provides the necessary isolation between transistor 43 and the output of controller 14. The outputs of D/A converter 46 are provided to the base and emitter of transistor 43 so as to turn on transistor 43 to the desired degree. D/A converter 46 is "isolated" in that it provides electrical isolation between the lower voltages used for operation of controller 14 and the higher voltages present on transistor 43 when batteries B are connected in series.

It will be seen from the above that the preferred embodiment of the present invention has modules 12A–12N connected in parallel with batteries B1–BN, respectively. A module 12 shunts around its respective battery B a portion of the charging current which is in excess of that needed to properly charge the battery B. The present invention also has devices 34, 45, 24 and 25 for measuring the current supplied to or drawn from individual batteries as well as for the series combination of batteries, voltage measurement devices 40, 22 and 23 for measuring the voltage across individual batteries, temperature measuring devices 13, 20 and 21 for measuring the temperature of each battery, and a controller 14 responsive to the state of charge of each individual battery for determining the amount of charging current to be shunted around a battery, as determined by the battery voltage and battery temperature.

The present invention allows the voltage of each battery to be measured during a charging process or a discharging process, or an idle period. The controller uses this information to determine the state of charge of each battery and of the series combination of batteries so that charging current may be tailored to match the current condition of each of the batteries without interrupting the charging or discharging processes. In the preferred embodiment, the equalization process is performed simultaneously with the charging process. That is, during charging, controller 14 measures the voltage across each battery, preferably when the charging current is being applied, to determine the state of charge and condition of each battery. If the voltage across the battery is high then the battery requires less charging current so controller 14 will cause transistor 43 in module 12 to shunt (bypass) around that battery the portion of the charging current which is in excess of the current needed to properly charge that battery. For example, if the charging current being applied is 100 amps but battery B1 only needs 10 amps for proper charging then controller 14 will cause transistor 43 of module 12A to shunt more and more current around battery B1 until the voltage across battery B1 is within acceptable limits, which in this case means that transistor 43 will be shunting 90 amps of the charging current around battery B1. This allows the full 100 amps of charging current to be provided to another battery which is undercharged and needs the full 100 amps to properly charge, while preventing overcharging of and damage to battery B1.

In the preferred embodiment, controller 14 displays and periodically updates the state of charge of the batteries so that the operator is continually informed the available energy stored in the batteries. The status display advises of the voltage of the series combination of batteries, the temperature of each battery, and the relative states of charge among the different batteries.

In the preferred embodiment, the equalization process is automatically performed whenever charging is being performed. This serves to maintain all the batteries in a proper state of charge and prevents any battery from being undercharged with respect to the rest of the batteries. This continuous process allows detection and identification of a weak cell or battery at an early point in time so that the battery can be equalized with respect to the rest of the batteries and thereby prevent the weak battery from being further weakened or being seriously damaged or so that the operator can be alerted of the problem and prevent future, more serious problems.

In some situations, batteries are connected in series to form a high voltage battery pack and several of these high voltage battery packs are connected in parallel to provide a desired current capability. The present invention is also useful therewith. The charging device should be able to treat each battery pack independently or else charging current will be completely shunted around a fully charged battery pack and energy thereby wasted. Separate modules 12 would be used for each of the paralleled battery packs but a common controller 14 would be used.

It should be noted that the present invention is useful with electric vehicles. In an electrically powered vehicle an electric motor draws power from the batteries B during acceleration and cruising and can return power (regeneration) to the batteries B during braking. In this situation, the present invention can monitor the state of charge of the different batteries B1–BN during the driving and braking conditions and maintain the different batteries B–BN at the same state of charge. Also, controller 14, by monitoring the charge placed into each battery B1–BN and the power drawn from each battery B1–BN, can determine the remaining energy in each battery and therefore provide an indication to the operator of the state of charge of the batteries, individually or as a battery pack unit, as desired.

Although transistor 43 is shown as a bipolar transistor, it will be appreciated that field effect transistors and other types of power semiconductors may be used instead.

Figure 2B:
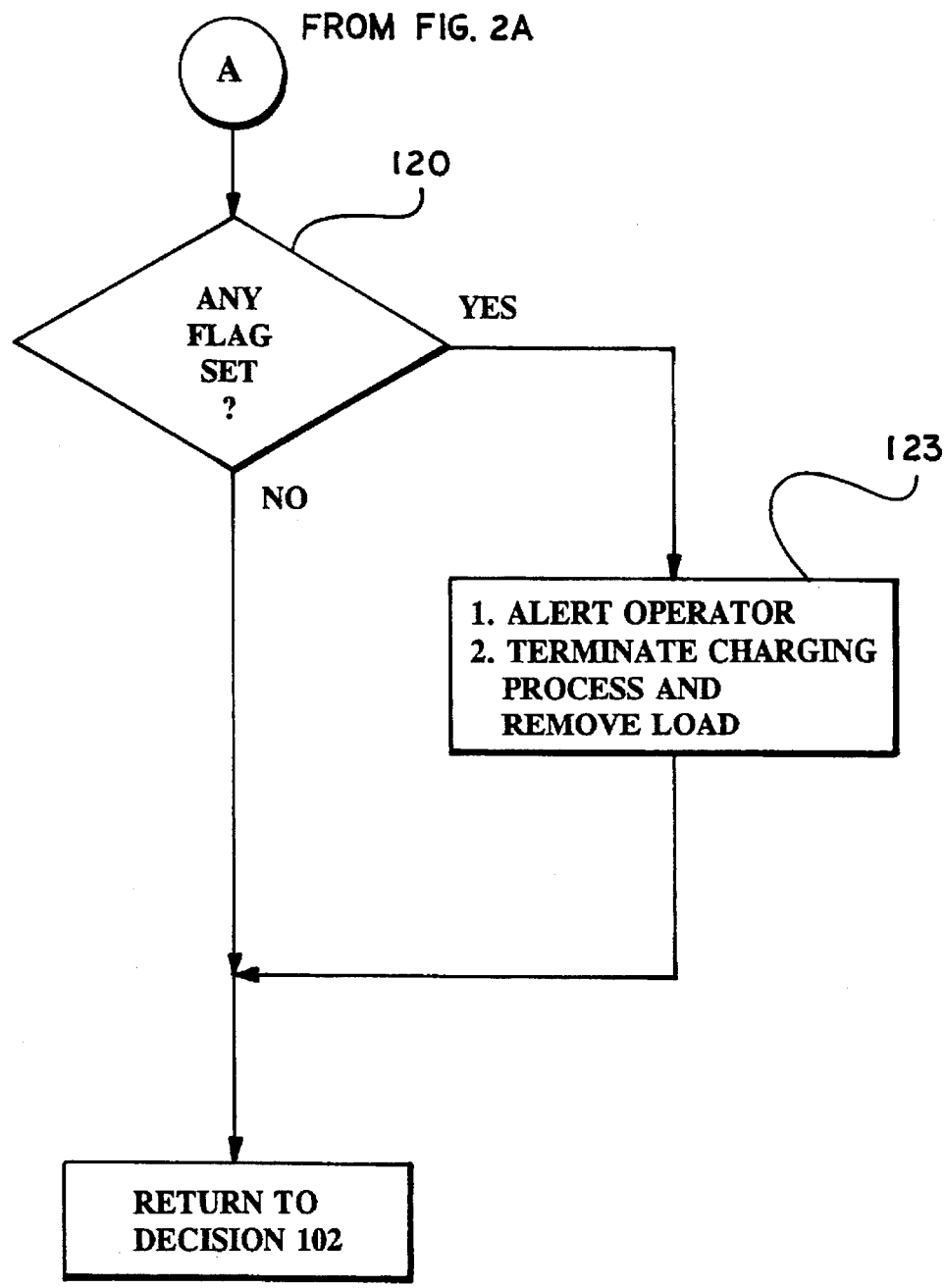

FIGS. 2A and 2B are a flow chart illustrating the operation of the preferred embodiment of the present invention. Upon starting, controller 14, in step 101, initializes the system by turning off transistor 43, and clearing battery voltage, temperature, current, and state of charge values, if any, left over from a previous operation. Controller 14 then displays, via display 16, the status of the battery pack. In environments where there are no user-selectable options, such as in an electric vehicle, controller 14 does not display options. In situations where there are user-selectable options, such as a vehicle servicing and maintenance area, controller 14 displays the options and accepts, via keyboard 15, the selected options such as the nominal voltage of each battery B, or the nominal voltage of the series combination of batteries B1–BN, the number of batteries connected in series, the amp-hour rating of the battery, the manufacturer name and battery type, etc. This information allows controller 14 to determine the initial charging parameters, such as the proper charging current, pulse width, number of pulse repetitions, charging time, etc.

At decision 102, a determination is made as to whether a charging current is being applied. If a charging current is being applied then, in step 103, the state of charge of each of the batteries B1–BN is determined, such as by measuring the voltage across each of the batteries, the temperature of each of the batteries B1–BN is measured. Also, X is set to 1. As will be seen below, X is incremented between 1 and N so that the following measurements, tests and settings are performed for each of the batteries B1–BN. In step 105 controller 14 determines the portion of the charging current to be shunted for battery BX. If battery BX has a low state of charge, as indicated by a low battery voltage, then the portion to be shunted around battery BX may be zero; that is, the entire charging current will be allowed to flow through battery BX. However, if battery BX is fully charged, as indicated by a higher battery voltage, then most or all of the charging current may be shunted around battery BX. At decision 106 controller 14 inspects the temperature of battery BX. If the battery temperature is in the nominal range then no adjustment to the charging current portion needs to be made and controller 14 proceeds to decision 107. If the battery temperature is low then controller 14 will, in step 110, decrease the portion of the charging current to be shunted around battery BX. This will have the effect of forcing more of the charging current through battery BX, thereby causing heating of battery BX so as to bring the temperature of battery BX to the nominal range. Controller 14 then proceeds to decision 107. If the temperature of battery BX is high then, in step 111, controller 14 will increase the portion of the charging current to be shunted around battery BX. This has the effect of providing less charging current to battery BX and therefore allowing battery BX to cool until the temperature of battery BX is within the nominal temperature range. Controller 14 then executes decision 107. If, at decision 106, the temperature of battery BX is excessive then, in step 112, controller 14 will set a flag for battery BX and then proceed to decision 107.

At decision 107 controller 14 tests whether each of the batteries have been inspected. If not then, in step 113, controller 14 increments the value of X and returns to step 105. If all the batteries have been tested (X=N) then controller 14 determines, at decision 120 whether any flag was set to indicate that the temperature for any battery was excessive. If not then controller 14 returns to decision 102. The charging current may be applied as a pulse charging current, a series of pulses of charging current, or a direct current (non-pulsed) charging current, and may be applied for a single pulse, a predetermined number of pulses, or a predetermined duration. When the charging current is being applied controller 14 turns on transistor 43 in each of the modules 12A–12N to the degree desired for shunting of the proper portion of the charging current for each battery B1–BN. For example, if battery B1 has a low state of charge then transistor 43 in module 12A will be turned off so that the full charging current is supplied to battery B1. However, if battery B2 is almost completely charged and requires very little charging current then the transistor 43 in module 12B would be turned on so as to shunt most or all of the charging current through module 12B so as not to overcharge battery B2. Likewise, battery BN may have a charge intermediate that of batteries B1 and B2 and therefore the amount of current shunted by transistor 43 in module 12N would be more than the current shunted for battery B1 but less than the current shunted for battery B2. Therefore, by adjusting the amount of charging current shunted around each battery B, each battery B receives the charging current appropriate to charge the battery given its existing state of charge. Current sensor 45, modules 12 and resistor 34 allow controller 14 to determine the total charging current as well as the current shunted around each battery and, if necessary, to make pulse-to-pulse adjustments of the base drive of transistor 43 of each module 12A-12N so as to achieve the desired degree of shunting for each battery B1–BN.

If, at decision 120, any battery temperature has been labeled as excessive then controller 14 will proceed to step 123 wherein it alerts the operator that the battery temperature of a specified battery or batteries is excessively high. Display 16 may be a light or a video display, and may also have an audible device such as a beeper or buzzer to alert the operator that the operator needs to inspect display 16. An excessive battery temperature can cause catastrophic failure of the battery with resultant damage to other batteries, and material and persons in the area. Therefore, if an excessive battery temperature is detected controller 14 will alert the operator. Preferably, controller 14 will also send via its emergency E output a signal to the charging device 30 to terminate the charging process and a signal to the load device 32 to reduce or remove the load, if possible. The operator can then inspect the battery to determine if the battery is low on water, improperly ventilated, or should be replaced.

At decision 102, if a charging current is not being drawn, then, in step 130, controller 14 may, as a design option, and, in a manner similar to step 103, measure the state of charge of each battery B1–BN under a load or in an idle condition and measure the temperature of each battery B1–BN. The information obtained in step 130 may be used in addition to, or instead of, the information gathered in step 103. In one alternative embodiment measurements are taken when a load is applied and these measurements are used to adjust the charging current in step 105. In another alternative embodiment measurements are made when no load is being applied and these measurements were used to determine the charging current in step 105. Of course, it is also possible to obtain measurements during charging, during a load condition, and during an idle period, and using an average of these measurements to determine the charging current in step 105. After the measurements, if any, are made in step 130 then controller 14 returns to decision 102.

In the environment of an electrically powered vehicle, controller 14 would use primarily use the "charge" branch of decision 102 during the braking mode and during vehicle "refueling" (recharging) operations.

From the detailed description above and the accompanying drawings, other embodiments of the present invention may suggest themselves to those of skill in the art. Therefore, the present invention is to be limited only by the claims below.

I claim:

1. A method for equalizing a state of charge among a series-connected first cell and second cell during a charge process wherein a charging current is applied to said series-connected first cell and secured cell, comprising the steps of:

measuring the temperature of said first cell and the temperature of said second cell;

calculating a portion of said charging current to be shunted around said first cell based upon said temperature of said first cell, and a portion of said charging current to be shunted around said second cell based upon said temperature of said second cell; and shunting around said first cell said portion of said charging current calculated for said first cell, and shunting around said second cell said portion of said charging current calculated for said second cell.

2. The method of claim 1 wherein said charging current is applied for a charging pulse period and said step of calculating is performed before said charging pulse period.

3. A method for equalizing a state of charge for each cell in a plurality of series-connected cells during a charging process wherein a charging current is applied to said plurality of series-connected cells, comprising the steps of:

measuring the temperature of each said cell;

calculating a portion of a charging current to be shunted around each said cell based upon said temperature of that said cell; and shunting around each said cell said portion of said charging current calculated for that said cell.

4. The method of claim 3 wherein said charging current is applied for a charging pulse period and said step of calculating is performed before said charging pulse period.

5. An apparatus for equalizing a state of charge among a series-connected first cell and second cell during a charging process wherein a charging current is applied to said series-connected first cell and second cell, comprising in combination:

first means for measuring the temperature of said first cell;

second means for measuring the temperature of said second cell;

first means for shunting around said first cell a portion of said charging current;

second means for shunting around said second cell a portion of said charging current; and controller means responsive to said temperature of said first cell for calculating said portion of said charging current to be shunted around said first cell, and responsive to said temperature of said second cell for calculating said portion of said charging current to be shunted around said second cell, and for controlling said means for shunting around said first cell, and said means for shunting around said second cell.

6. The apparatus of claim 5 wherein said controller causes said first means for measuring and said second means for measuring to measure said temperature when said charging current is not being applied to said series-connected first cell and second cell.

* * * * *